(12) United States Patent
Chaply et al.

(10) Patent No.: US 6,400,558 B1
(45) Date of Patent: Jun. 4, 2002

(54) LINE DEADEND STRUCTURE AND METHOD

(75) Inventors: Daniel Chaply, Orefield; Andrew S. Harakal, Jr., Coplay; James E. Conley, Ephrata, all of PA (US)

(73) Assignee: PPL Electric Utilities Corporation, Allentown, PA (US)

( * ) Notice: Subject to any disclaimer, the term of this patent is extended or adjusted under 35 U.S.C. 154(b) by 0 days.

(21) Appl. No.: 09/707,961

(22) Filed: Nov. 8, 2000

(51) Int. Cl.⁷ .................................................. H02B 1/00
(52) U.S. Cl. ..................... 361/600; 361/601; 174/45 R; 211/107; 248/219.1; 248/219.2; 248/219.3
(58) Field of Search ................................ 361/600, 601, 361/602, 603; 174/43, 44, 45 R, 45 TD, 40 R, 158 R, 177

(56) References Cited

U.S. PATENT DOCUMENTS

| | | | |
|---|---|---|---|
| 3,647,996 A | * 3/1972 | Bernatt et al. | 200/48 R |
| 3,671,002 A | * 6/1972 | Elliott et al. | 248/300 |
| 3,706,839 A | * 12/1972 | Comte et al. | 174/45 TD |
| 3,715,460 A |   2/1973 | Elliott et al. | |
| 3,839,835 A | * 10/1974 | Meyer | 52/296 |
| 4,025,824 A | * 5/1977 | Cheatham | 361/601 |
| 4,071,882 A |   1/1978 | Rehder | |
| 4,117,256 A | * 9/1978 | Williams | 174/40 R |
| 4,127,739 A |   11/1978 | Farmer | |
| 4,183,686 A | * 1/1980 | De France | 403/11 |

FOREIGN PATENT DOCUMENTS

JP   6-153350   5/1994

* cited by examiner

*Primary Examiner*—Leo P. Picard
*Assistant Examiner*—Boris L. Chervinsky
(74) *Attorney, Agent, or Firm*—Morgan, Lewis & Bockius LLP

(57) ABSTRACT

A line deadend structure and method for using the same are disclosed in which three phase power lines can be attached to a single pole at different elevational locations on the pole. The lines can be attached to switches and can each be arranged to extend downward along the single pole at various differently spaced locations about the periphery/circumference of the single pole. The wires can then be connected to an electrical mechanism, such as a circuit breaker or transformer, which is located on the ground or at a lower level than the original wire connection location on the single pole. Tap mechanisms and/or fuse mechanisms can also be located on the single pole and in connection with the three phase lines to provide electrical access to the lines and/or fusing operations, respectively.

29 Claims, 7 Drawing Sheets

LINE DEADEND STRUCTURE AND METHOD

BACKGROUND OF THE INVENTION

1. Field of the Invention

The invention concerns a line deadend structure and method for securing transmission or distribution lines at a termination point. More specifically, the invention is directed to a substation deadend structure that includes a single pole which is connected to three-phase high voltage lines and which drops the lines to an electrical mechanism located at ground level. Although directed toward utility systems, this invention is applicable to both utility and non-utility installations.

2. Discussion of the Related Art

Very high voltage is routinely transmitted over 3 transmission wires which, in North America, are referred to as A-phase voltage, B-phase voltage, and C-phase voltage wires. In other areas of the world, transmission wires are sometimes referred to differently, such as R, S and T phase wires in Europe. Once voltage that is carried over the transmission lines reaches an area, such as a town, city, subdivision, large industrial facility, etc., in which the power will be used, voltage is stepped down at a substation to a working level.

Typically, large metal or concrete frame dead end structures have been used to anchor or terminate the ends of the transmission lines at the substations. The large frame structures are necessary to counter the high tension forces present in the transmission lines. The dead end structure permits the transmission lines to be dropped closer to the ground and connected to apparatus for disconnecting, protecting, and stepping down the voltage, e.g., a switch, a circuit breaker and a transformer, respectively. Disconnect switches are located on or near the dead end frame structure between the transmission power lines and the power lines that are dropped to ground level (also known as "tap connections"). The switches can be used to cut off power to the substation and physically isolate the electrical connection between the substation and the transmission line.

Three main types of dead end frame structures have conventionally been used to anchor both transmission and distribution lines. An "A" frame structure has been used as a deadend structure and includes four beams that rise in pairs from the ground and angle towards each other to meet at two spaced apart connection points. Horizontally oriented beam(s) bridge the two pairs of beams to create the "A" frame structure. Transmission lines are connected to and terminate at the horizontally oriented beam(s). The "A" frame has four legs and therefore requires a large foundation for connection of each of its legs to the ground. Thus, the "A" frame also requires a large amount of ground area due to the relatively large "footprint" of the connective foundation.

An "H" frame structure has also been conventionally used as a deadend structure. The "H" frame structure has two beams that extend from the ground and are joined at their mid-section by a cross beam. Transmission lines are connected to and terminate at the cross beam. The "H" frame also requires a large footprint to attach each of its two legs to the ground.

The third conventional dead end structure is a "box" or "open" frame structure. The "box" or "open" frame structure includes a plurality of leg members that are secured to foundations in the ground, with a box shaped structure including beams that are suspended by the legs. Transmission lines are connected to and terminate at the beams of the box shaped structure. Again, the many leg members result in a large footprint for the "box" or "open" frame structure.

Conventional dead end structures require a large amount of real estate for installation due to their large footprints. The structures are also relatively expensive to manufacture due to the many different components and the cost of real estate, and are also difficult and timely to install. In addition, it is difficult to access remote and mountainous area with the conventional deadend structures due to their large footprint and relative difficult and time consuming installation process.

SUMMARY OF THE INVENTION

The invention is directed to a structure and method that "anchors" the ends of a transmission line at a substation or other location and uses a minimal amount of area for ground connection, i.e., leaves a small footprint. The invention includes a single pole on which each of the ends of a 3 phase transmission line can be connected and by which the transmission line can be dropped from the top of the single pole to an electrical apparatus on the ground level. The pole can be physically connected to the ground via a single foundation in order to use the least amount of area for installation.

Additional features and advantages of the invention will be set forth in the description that follows, and in part, will be apparent from the description, or may be learned by practice of the invention. The objectives and other advantages of the invention will be realized and achieved by the structure particularly pointed out in the written description and claims hereof as well as the appended drawings.

To achieve this and other advantages, and in accordance with the purpose of the invention as embodied and broadly described, the invention provides a single pole utility line deadend structure that includes first, second and third connectors positioned on the single pole at first, second and third connector locations, respectively. The connectors can be configured in a vertical row for connection to transmission lines. A fourth connector is preferably positioned on the single pole at a fourth connector location that is at a different elevation and a different circumferential position than said first, second and third connector locations with respect to said single pole.

In accordance with another aspect of the invention, a single pole includes means for connecting to transmission lines and means for dropping three phase power lines from a first elevation to a second lower elevation along said single pole.

In accordance with yet another aspect of the invention, a method for dropping electric wire to a lower level includes providing a single pole structure and connecting a first wire at a first location on the single pole. The method includes connecting a first wire at a second location that is at a different elevation and different circumferential position with respect to the single pole structure than the first location. The method also includes dropping the first wire along the single pole structure from the second location.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Below, preferred working configurations of the invention will be described in detail with reference to FIGS. 1 through 7B.

Figures 1A, 1B:
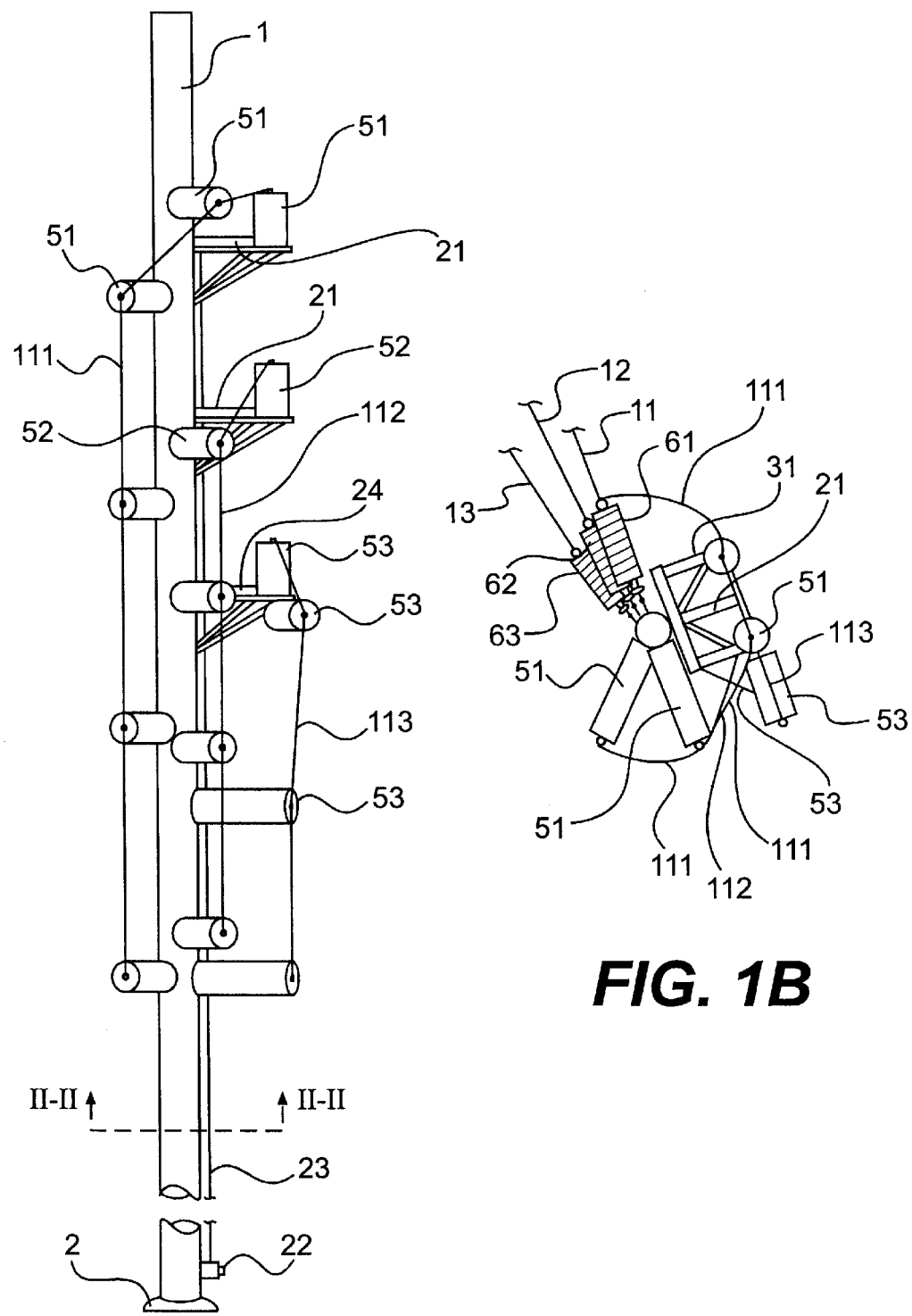
FIGS. 1A and B are a front and top view, respectively, of a single pole line deadend structure made in accordance with the principles of the invention.

FIG. 1A shows a transmission line deadend structure that includes a single pole 1 attached to the ground via base 2. The transmission line includes A-phase (Aφ) wire 11, B-phase (Bφ) wire 12, and C-phase (Cφ) wire 13. The transmission wires 11–13 can be attached at the "012 face" (see FIG. 2) of the single pole 1 via suspension insulators 61–63, respectively. The suspension insulators 61–63 can be made of porcelain, silicon/rubber or other insulative materials and prevent voltage from transferring from the transmission lines 11–13 to the pole. Power lines 111–113 can be connected at an end of each of the transmission lines 11–13, respectively, and immediately adjacent the respective suspension insulator 61–63. The power lines 111–113 transmit the high voltage electricity from each transmission wire to a corresponding disconnect switch 21, which is preferably located at the "03-face" of the pole (a position 90 degrees away from the transmission wire attachment position). The switch 21 can also be located at the "09-face" (or other faces) depending on how the power lines are to be dropped down the single pole. If the switch 21 is located at the "09 face", the transmission lines are preferably connected to the single pole with the Cφ wire 13 located above the Bφ wire 12, and the Bφ wire 12 located above the Aφ wire 11, such that the transmission wires are oriented in the opposite vertical sequential arrangement as compared to when the switch 21 is located on the "03-face."

Power can be transmitted from the disconnect switch 21 to an electrical mechanism located on the ground via power lines 111–113 that extend from the disconnect switches 21, run along the outside of the single pole 1, and eventually connect to the electrical mechanism. Post insulators 51–53 are carefully arranged along the pole to ensure that their respective power lines 111–113 are maintained at a distance from the pole, maintain a design separation from adjacent lines, and are electrically insulated from the pole. A preferred arrangement for the post insulators is shown in FIG. 1. However, other alternative arrangements can be used to drop the power lines 111–113 along the single pole 1 as long as the arrangement maintains safe distance between respective lines and from the single pole 1.

The post insulators 51 are arranged such that the power line 111 can be attached from the suspension insulator 61 to the switch 21 and then over to a post insulator 51 located at the 06 face of the single pole, which is 180 degrees from the attachment point of the transmission lines 11–13 on the single pole 1. The power line is then wrapped (in a counterclockwise direction as viewed from FIG. 2) around the single pole 1 and dropped to another post insulator 51 located on the 08 face of the single pole 1. The power line 11 is then dropped downward and parallel along the 08 face of the single pole 1 via additional post insulator(s) 51.

Post insulators 52 are arranged such that power line 112 can be attached from the suspension insulator 62 to switch 21. The power line 112 can then be wrapped (in a counterclockwise fashion as viewed from FIG. 2) over to a post insulator 52 located at the 06 face of the single pole, which is located 180 degrees from the attachment point of the transmission lines 11–13 on the single pole 1. The power line 112 is then dropped parallel to the single pole 1 along face 06 via additional post insulator(s).52.

Post insulators 53 are arranged such that the power line 113 can be wrapped (in a counterclockwise fashion as viewed from FIG. 2) from the suspension insulator 63 to switch 21 and then out to a post insulator 53 that is attached to and extends outward from a side of the switch platform 31. The power line 113 is then redirected and wrapped (in a clockwise direction as viewed from FIG. 2) for attachment to a post insulator 53 located at the 04 face of the single pole 1. The power line 113 is then dropped parallel to the single pole 1 along face 04 via additional post insulator(s) 5.

Disconnect switch 21 can be operated via a switch control 22 located near the base of the pole 1 for access by personnel on the ground. A rotary switch control pole 23 connects the switch control 23 to the switch 21 to apply the torque necessary to open or close the switch 21. A switch platform 31 can be located underneath each of the switches 21 to support the switches 21 at a location adjacent their respective transmission line 11–13.

Figure 2:
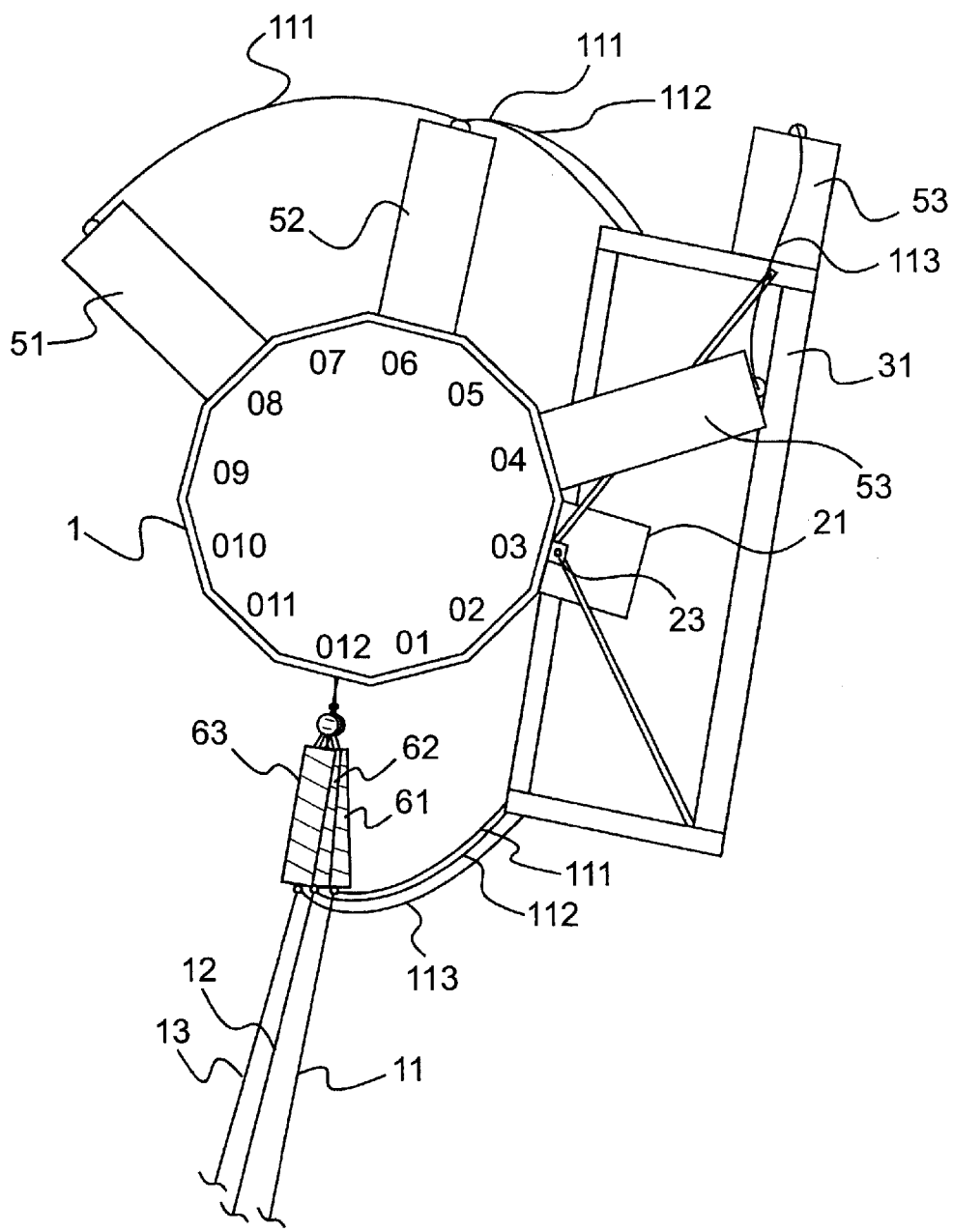
FIG. 2 is an enlarged cross-sectional view along line II—II of FIG. 1A.

As shown in FIG. 2, each of the power lines 111–113 can extend downward along the pole 1 at a different circumferential position with respect to the pole. Accordingly, each of the power lines is effectively insulated from each other. The specific spacing between the power lines 111–113 and the overall dimension of the pole can vary as long as certain minimum distances are maintained. The arrangement shown in FIG. 2 includes post insulators 51 arranged along a substantial length of the 08 face of the single pole 1 to drop and guide the Aφ line 111 down the single pole. Similarly, a number of post insulators 52 are located on the 06 face of the single pole 1 in order to drop the Bφ wire towards the ground, and a number of post insulators 53 are located on the 04 face of the single pole 1 in order to drop the Cφ wire towards the ground. In this configuration, a post insulator 53 can be attached to the switch platform 31 located adjacent the transmission line wire 13 to guide the power line 113 to the post insulators 53 located on the 04 face of the single pole 1. In addition, at least one post insulator 51 can be located on the 06 face of the single pole 1 to help guide the power line 111 to the post insulators 51 located on the 08 face of the single pole 1.

Figure 3:
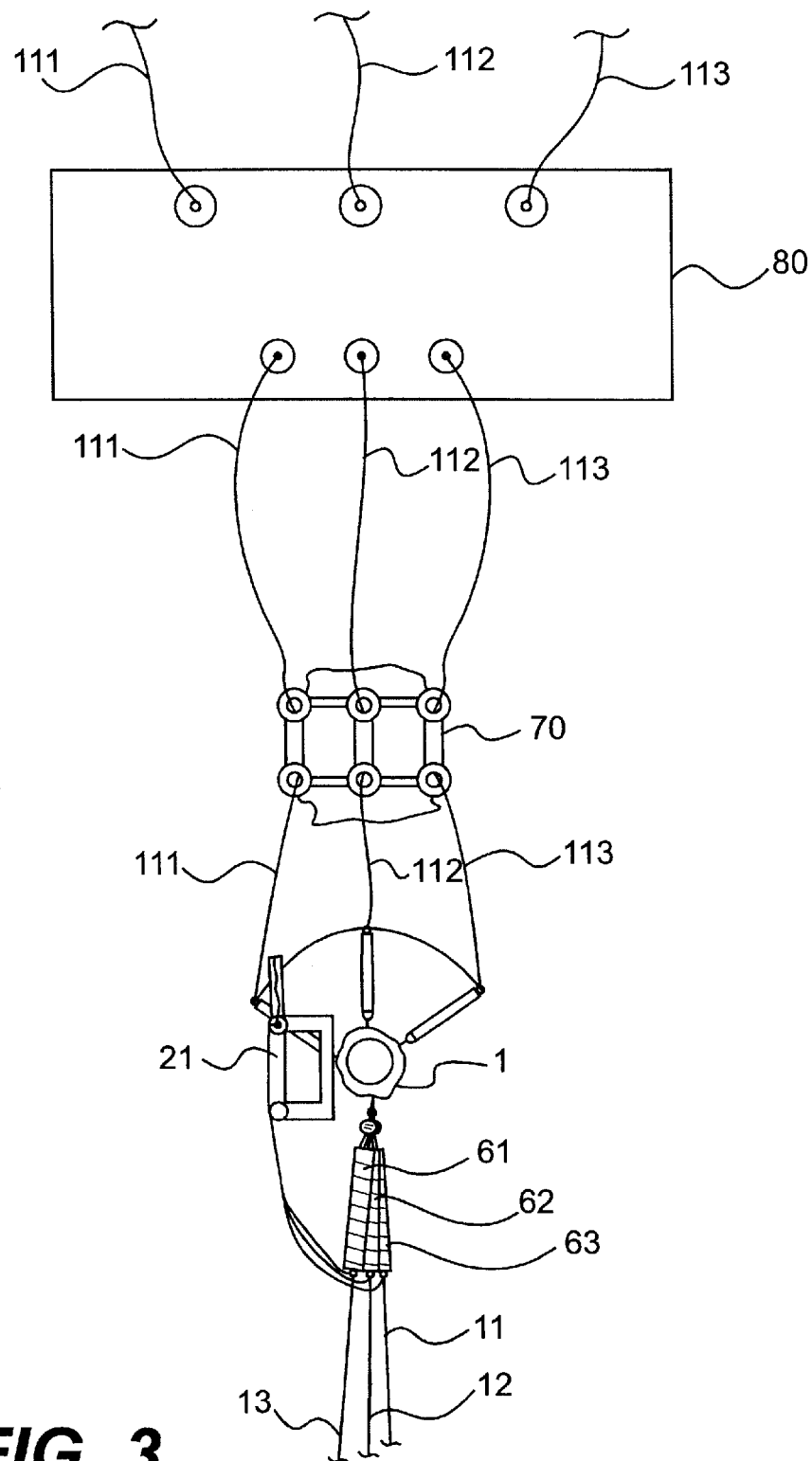
FIG. 3 is a top view of the single pole line deadend structure of FIG. 1 in a working environment.
Figure 4:
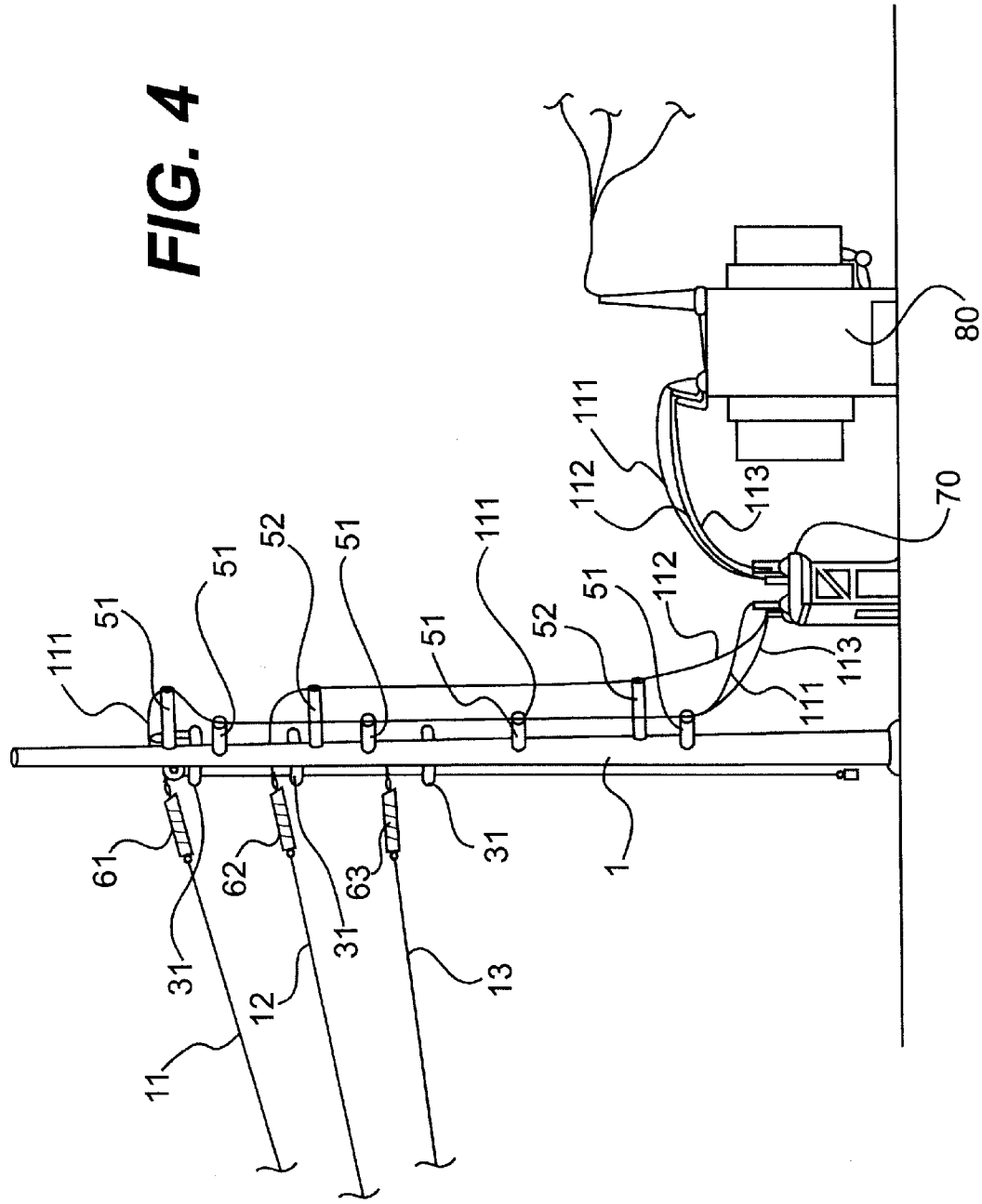
FIG. 4 is a right side view of the single pole line deadend structure of FIG. 1 in a working environment.
Figure 5:
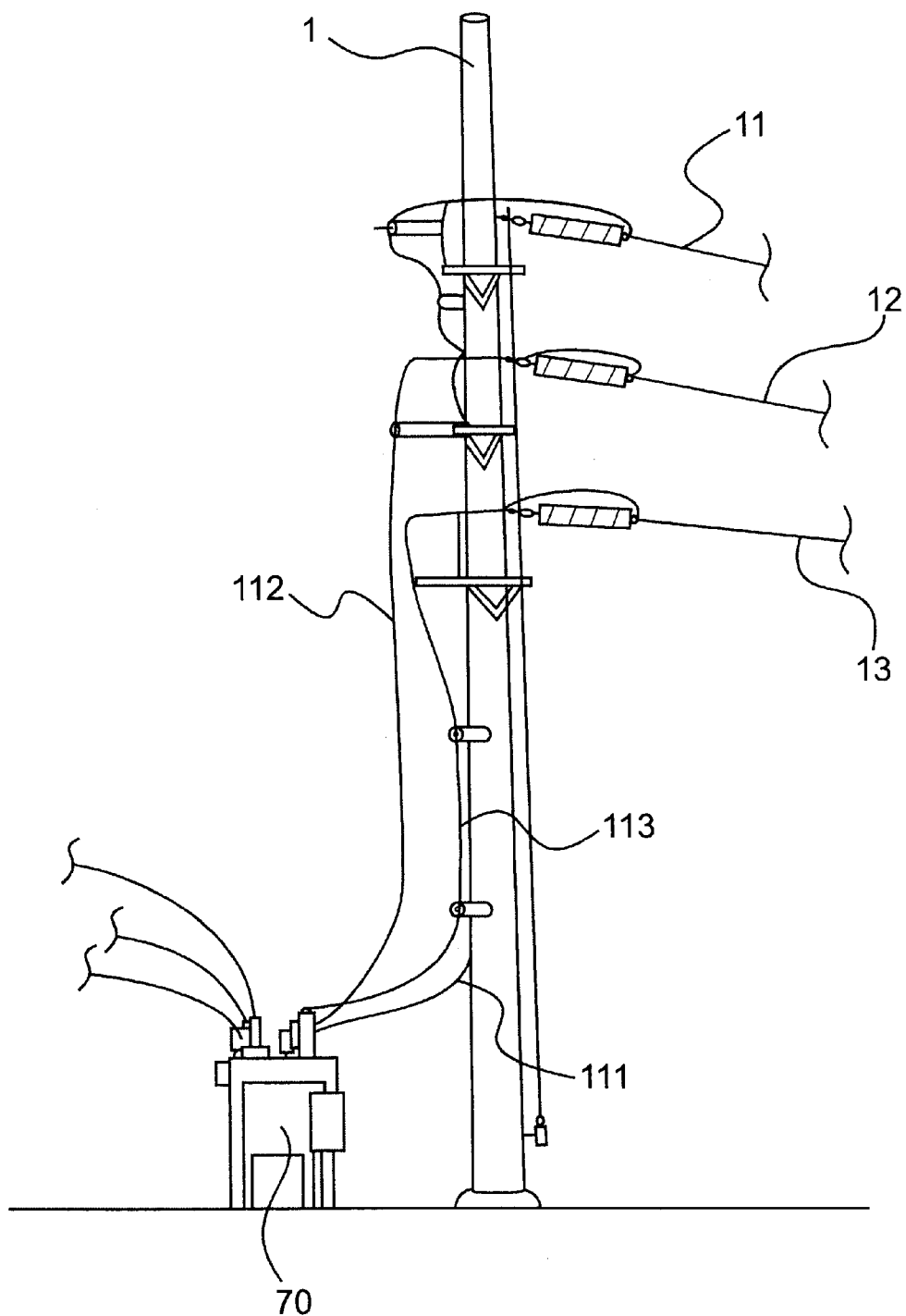
FIG. 5 is a left side view of the single pole line deadend structure of FIG. 1 in a working environment.

FIGS. 3–5 show a top view, a left side view and a right side view, respectively, of the single pole 1 located in a working environment. Transmission lines 11–13 can be attached to the single pole at the 012 face (located at the lowermost position as shown in FIG. 3). Power lines 111–113 can be attached to the transmission line 11–13, respectively, and can be run through a switch 21 prior to being routed down the single pole 1 along the post insulators 51–53, respectively. Once at ground level, the power lines 111–113 can be guided to an electrical mechanism, such as a circuit breaker 70 and transformer 80 as shown in FIG. 3. The power lines 111–113 can then be guided to the intended user of the electrical power, for example, a town, a plant, a housing community, etc.

Figure 6A:
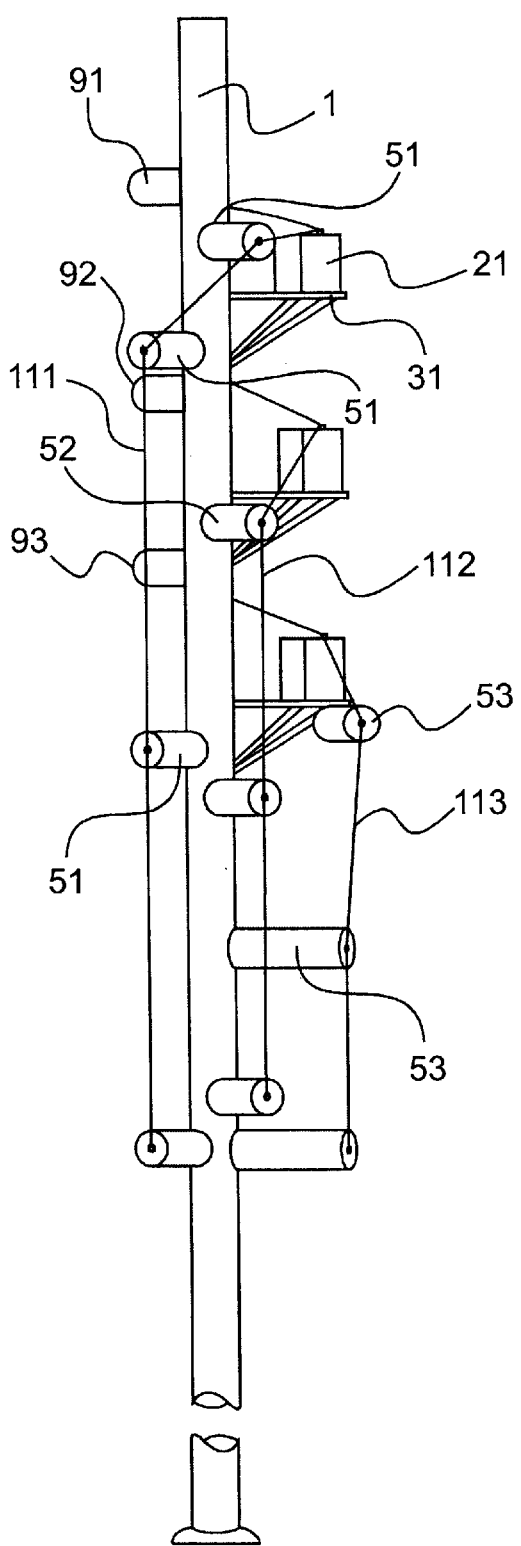
FIGS. 6A and B are a front view and a top view, respectively, of another embodiment of the invention.
Figure 6B:
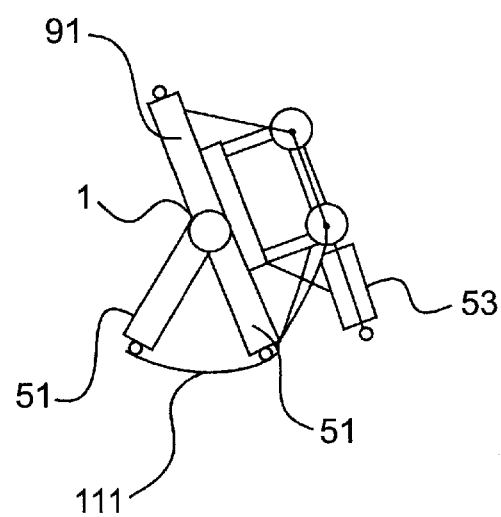

FIGS. 6A–B show another embodiment of the invention in which a tapping post 91 can be secured to the single pole 1 to allow another transmission line to be connected to the transmission lines 11–13 attached to the single pole 1. A tapping post 91 can be located adjacent the switch 21 and have a power line connecting it to its respective transmission line. Preferably, the tapping post is located at "face 012" of the single pole 1 and just above the switch 21. The tapping post 91 permits quick and easy and significantly economical access to a transmission line 11–13 located adjacent the single pole 1.

Figure 7A:
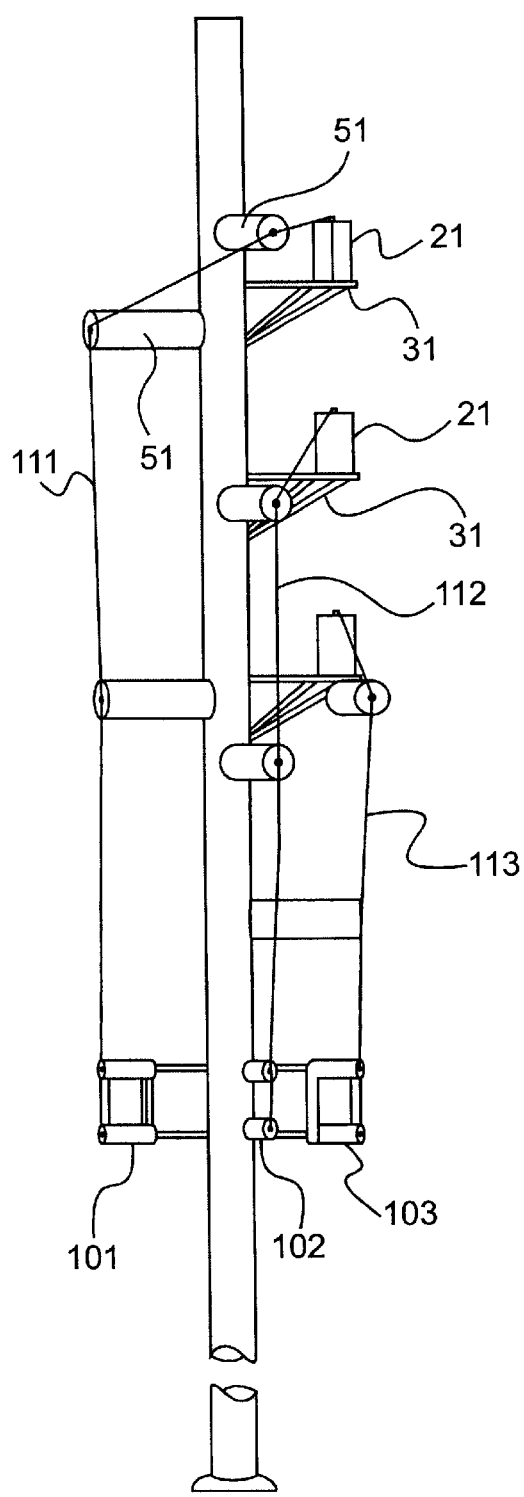
FIGS. 7A and 7B are a front view and a top view, respectively, of another embodiment of the invention.
Figure 7B:
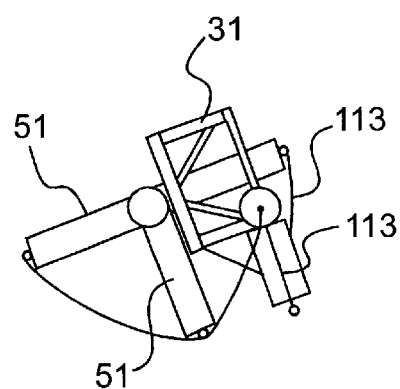

FIGS. 7A–B show another embodiment of the invention which includes a single pole 1 that has fuses 101–103 attached at 90 degree intervals, e.g. at faces 09, 06 and 03 respectively, of the single pole 1. Power line 111 can be guided by post insulators 51 to run downward along face 09 of the single pole for connection to fuse 101. Similarly, power lines 112 and 113 can be guided by post insulators 52 and 53, respectively, to run downward along faces 06 and 03, respectively, for connection to fuses 102 and 103, respectively. Thus, each of the fuses 101–103 can be separated by 90 degrees about the circumference of the single pole 1. In another embodiment of the invention, it is contemplated that the degree of separation between fuses is 45 degrees. This 45 degree separation can be accomplished by having the power lines 111–113 run downward along faces 04, 06, and 08 of the single pole 1. Different faces of the single pole 1 can be used to attach the fuses 101–103, and the angle of separation between the fuses and/or power lines can be different.

The utility line deadend structure as described can include several variations and modifications without departing from the spirit and scope of the invention. For example, the invention does not require the use of a switch 21 mounted on the single pole 1 for each of the power lines. Instead, switching operations could conceivably be done either on the ground, at a different location on the single pole 1, on a separate switch support structure, or at a different location elsewhere on the transmission line. Other electrical mechanisms could also be attached to the single pole and connected to the power line(s) 111–113, or transmission line(s) 11–13. For example, a transformer, circuit breaker, fuse, tapping or other mechanism could be installed on the single pole.

The physical arrangement of the post insulators 51–53 can also be rearranged as necessary to fit the purpose of a specific application of the invention. For example, the post insulators 51–53 could be attached at different faces of the pole 1 such that the power lines spiral downwards along the single pole 1 or zig-zag down the single pole 1. Thus, different configurations of the invention can be achieved to avoid obstructions and/or to provide a more compact single pole line deadend structure.

The transmission lines 11–13 and power lines 111–113 can be constructed from insulated or non-insulated wires. The single pole 1 is preferably a 12 face pole made from aluminum, steel, alloys, other metals or concrete. However, the single pole 1 can be made from wood, plastics, rubbers, ceramics, carbon based composites, fiberglass, ceramics or other composites. In addition, the single pole 1 can have a different number of faces and/or can have a cross-section of other geometric shapes, such as a circle or oval.

The positioning of the power lines 111–113 and the associated post insulators 51–53 around the circumference of the single pole 1 is important to maintain proper electrical clearance and to endure static, dynamic and electromagnetic changes in stability of both the line deadend structure itself and the power lines and conductors that are attached to the single pole 1. The specific clearance distances can be determined in an application by application basis. Also of importance is the location of the post insulators 51–53 along the single pole structure. The exact vertical position of the post insulators 51–53 along the length of the single pole 1 for a specific installation must be adjusted in the design of the line deadend structure to thereby account for the differences in the height of the single pole 1, the height of the electrical and or associated mechanical equipment, and other related dimensional constraints.

It will be apparent to those skilled in the art that various modifications and variations can be made in the method and system of the present invention without departing from the spirit or scope of the invention. Thus, it is intended that the present invention cover the modifications and variations of this invention provided they come within the scope of the appended claims and their equivalents.

What is claimed is:

1. A single pole line deadend structure, comprising:

a single pole;

a first connector positioned on said single pole at a first connector location along an axis that is substantially parallel to a longitudinal axis of the single pole, said first connector configured to be connected to a first transmission line;

a second connector positioned on said single pole at a second connector location that is located along the axis that is substantially parallel to the longitudinal axis of the single pole, said second connector configured to be connected to a second transmission line;

a third connector positioned on said single pole at a third connector location that is located along the axis that is substantially parallel to the longitudinal axis of the single pole, said third connector configured to be connected to a third transmission line;

a fourth connector positioned on said single pole at a fourth connector location that is at a different elevation and a different circumferential position than said first connector location with respect to said single pole.

2. The single pole line deadend structure as set forth in claim 1, further comprising:

a first power line connected between said first connector and said fourth connector such that voltage received from the first transmission line can be transmitted through said first power line for connection to an electrical mechanism located adjacent a base portion of said single pole.

3. The single pole line deadend structure as set forth in claim 2, further comprising:

a fuse located on said single pole and connected to said first power line.

4. The single pole line deadend structure as set forth in claim 2, further comprising:

a switch located on said single pole and configured such that it can selectively prevent voltage from being transmitted along said first power line.

5. The single pole line deadend structure as set forth in claim 1, further comprising:

a tapping mechanism located on said single pole and configured to permit an external wire to be electrically connected to the first transmission line.

6. The single pole line deadend structure as set forth in claim 1, further comprising:

a fifth connector located on said single pole at a fifth connector location that is at a different elevation and a different circumferential position than said second connector location with respect to said single pole; and a sixth connector located on said single pole at a sixth connector location that is at a different elevation and a different circumferential position than said third connector location with respect to said single pole.

7. The single pole line deadend structure as set forth in claim 6, wherein said single pole is a twelve face pole and said fourth, fifth and sixth connectors are each located on a different face of said single pole.

8. The single pole line deadend structure as set forth in claim 6, further comprising:

a first power line connected between said first connector and said fourth connector such that voltage received from the first transmission line can be transmitted through said first power line for connection to an electrical mechanism located adjacent a base portion of said single pole;

a second power line connected between said second connector and said fifth connector such that voltage received from the second transmission line can be transmitted through said second power line for connection to an electrical mechanism located adjacent the base portion of said single pole;

a third power line connected between said third connector and said sixth connector such that voltage received from the third transmission line can be transmitted through said third power line for connection to an electrical mechanism located adjacent the base portion of said single pole.

9. The single pole line deadend structure as set forth in claim 8, further comprising:

a switch located on said single pole and configured such that it can selectively prevent voltage from being transmitted along said first power line.

10. The single pole line deadend structure as set forth in claim 8, further comprising:

a tapping mechanism located on said single pole and configured to permit an external wire to be electrically connected to the first power line.

11. The single pole line deadend structure as set forth in claim 8, further comprising:

a fuse mechanism located on said single pole.

12. The single pole line deadend structure as set forth in claim 8, wherein said single pole is a twelve face pole and said fourth, fifth and sixth connectors are located on different faces of the single pole, and a substantial portion of each of said first, second and third power lines runs along a different face of said single pole.

13. A single pole line deadend structure, comprising:

a single pole;

a plurality of power lines located on said single pole;

means for connecting each of said power lines on said single pole to a respective transmission line, said means for connecting located on said single pole;

means for dropping each of said power lines from a first elevation to a second lower elevation at a substantially constant spaced apart distance with respect to each other along said single pole, said means for dropping being located on said single pole, and said second lower elevation being located at a point more than substantially half of a distance from a top end to a bottom end of the single pole.

14. The single pole line deadend structure as set forth in claim 13, further comprising:

a switch located on said single pole and configured to selectively open one of said power lines so as to terminate a transmission of high voltage along said one of said power lines.

15. The single pole line deadend structure as set forth in claim 13, further comprising:

a tapping mechanism located on said single pole and configured to permit an external line to be connected to one of said power lines.

16. The single pole line deadend structure as set forth in claim 13, further comprising:

a fuse mechanism located on said single pole and configured to perform fusing operations with respect to one of said power lines.

17. The single pole line deadend structure as set forth in claim 13, wherein said single pole is a 12 face pole, and said means for dropping includes a plurality of post connectors attached to at least three different faces of said single pole.

18. A method for dropping electric wire to a lower level, comprising:

providing a single pole structure that includes, a single pole, a first connector positioned on said single pole at a first connector location along an axis that is substantially parallel to a longitudinal axis of the single pole, said first connector configured to be connected to a first transmission line, a second connector position on said single pole at a second connector location that is located along the axis that is substantially parallel to the longitudinal axis of the single pole, said second connector configured to be connected to a second transmission line, a third connector positioned on said single pole at a third connector location that is located along the axis that is substantially parallel to the longitudinal axis of the single pole, said third connector configured to be connected to a third transmission line, a fourth connector positioned on said single pole at a fourth connector location that is at a different elevation and a different circumferential position than said first connector location with respect to said single pole;

connecting a first wire at a first location on said single pole;

connecting said first wire at a second location on said single pole, said second location being at a different elevation and different circumferential position than said first location with respect to said single pole structure; and dropping said first wire along said single pole structure from said second location.

19. The method for dropping an electric wire as set forth in claim 18, further comprising:

connecting a second wire at a second wire first location on said single pole;

connecting said second wire at a second wire second location on said single pole, said second wire second location being at a different elevation and different circumferential position than said second wire first location with respect to said single pole structure.

20. The method for dropping an electric wire as set forth in claim 19, further comprising:

connecting a third wire at a third wire first location on said single pole;

connecting said third wire at a third wire second location on said single pole, said third wire second location being at a different elevation and different circumferential position than said third wire first location with respect to said single pole structure.

21. The method for dropping an electric wire as set forth in claim 20, wherein said first wire first location, said second wire first location, and said third wire first location are all located at different elevations and at approximately the same circumferential location with respect to said single pole structure.

22. The method for dropping an electric wire as set forth in claim 20, further comprising:

dropping said first, second and third wires from said first wire second location, second wire second location and third wire second location, respectively; and connecting said first, second and third wires to an electric mechanism.

23. The method for dropping an electric wire as set forth in claim 18, further comprising:

connecting said first wire to an electric mechanism;

providing a switch mechanism on said single pole structure; and connecting said first wire to said switch mechanism.

24. The method for dropping an electric wire as set forth in claim 18, further comprising:

providing a fuse mechanism on said single pole structure; and connecting said first wire to said fuse mechanism.

25. The method for dropping an electric wire as set forth in claim 18, further comprising:

providing a tap mechanism on said single pole structure; and connecting said first wire to said tap mechanism.

26. The method for dropping an electric wire as set forth in claim 18, wherein said step of connecting said first wire to said single pole structure includes providing an insulator structure and connecting said first wire to said single pole structure via sa id insulator structure.

27. The single pole line deadend structure as set forth in claim 1, wherein each of the first, second, third, and fourth connectors comprises an insulator.

28. The single pole line deadend structure as set forth in claim 6, wherein each of the fifth and sixth connectors comprises an insulator.

29. The single pole line deadend structure as set forth in claim 17, wherein each of said post connectors comprises an insulator.

* * * * *